US006188365B1

(12) United States Patent
Mattsson et al.

(10) Patent No.: US 6,188,365 B1
(45) Date of Patent: Feb. 13, 2001

(54) TESTING DEVICE AND METHOD

(75) Inventors: Jonas Mattsson, Sturefors; Sima Jansson, Linköping; Arne Lindelöf, Linghem, all of (SE)

(73) Assignee: Telefonaktiebolaget LM Ericsson (publ), Stockholm (SE)

( * ) Notice: Under 35 U.S.C. 154(b), the term of this patent shall be extended for 0 days.

(21) Appl. No.: 09/265,945

(22) Filed: Mar. 11, 1999

(30) Foreign Application Priority Data

Mar. 13, 1998 (SE) ...................................... 9800828

(51) Int. Cl.[7] ...................................... H04Q 7/20
(52) U.S. Cl. ............................ 343/703; 455/67.1
(58) Field of Search ...................... 455/67.1, 67.2, 455/90; 343/703, 702; 324/639, 376

(56) References Cited

U.S. PATENT DOCUMENTS 4,962,384 * 10/1990 Walker ................................. 343/786
6,021,315 * 2/2000 Telewski ............................. 455/67.1

OTHER PUBLICATIONS

Japanese Abstracts of Japan, Abstract of JP 7–267147 A, Oct. 13, 1995.

* cited by examiner

Primary Examiner—Don Wong
Assistant Examiner—James Clinger
(74) Attorney, Agent, or Firm—Burns, Doane, Swecker & Mathis, L.L.P.

(57) ABSTRACT

A device for testing a transmitter and/or receiver of electromagnetic waves includes a hollow metal body, dimensioned to function as a waveguide, including a hole for receiving a test antenna and a hole for receiving the receiver to be tested, a test antenna inserted into the hole, and a signal generating device connected to the test antenna. A method of testing the transmitting and/or receiving function of an antenna includes the steps of inserting the antenna and a test antenna into holes in the appropriate side of a waveguide, transmitting a signal from the antenna or the test antenna, and registering the signal strength received by the antenna or the test antenna that did not transmit the signal.

12 Claims, 3 Drawing Sheets

TESTING DEVICE AND METHOD

TECHNICAL FIELD

The present invention relates to mobile terminals, and in particular to a method and a device for testing the transmitter and receiver part of a mobile terminal.

BACKGROUND

When testing mobile terminals, both the output power and the receiver characteristics must be tested.

The test equipment should be made as small as possible, for ergonomic reasons and to reduce the space needed for test.

The transmitter/receiver tests may be carried out in different ways. One fundamental problem when testing is to shield the test equipment so that no irrelevant signals disturb the tests. Also, the test signals should not disturb other signalling, for example other tests. Therefore, it will not be possible to perform outdoor tests through the air interface. Shielded rooms and cages may be used, but the shielding material that is required on the walls cause power losses and also increases the size of the equipment.

The most commonly used method today is to connect the outlet of the antenna to the measurement equipment through a co-axial cable. This is only possible if the antenna is removable. Also, this method does not test the function of the antenna itself.

SUMMARY

It is an object of the present invention to enable the testing of mobile terminals or other similar equipment without removing the antenna. Other types of equipment may be, for example, radio receivers for pagers or remote control devices comprising radio transmitters, for example, for car alarms, It is another object of the present invention to enable the testing of mobile terminals via the air interface.

It is yet another object of the invention to achieve a relatively small test equipment for mobile terminals.

This is achieved according to the invention by an apparatus for testing a transmitter and/or receiver of electromagnetic waves, comprising:
 a hollow metal body, dimensioned to function as a waveguide for said electromagnetic waves, comprising a hole for receiving a test antenna, a hole for receiving the receiver to be tested,
 a test antenna inserted into said hole,
 a signal generating device connected to said test antenna.

The cross-section of the hollow metal body is preferably rectangular and the antenna and the test antenna are inserted from the same or opposite sides. The sides of the metal body not comprising said holes are completely solid.

The holes for inserting the test antenna and the antenna to be tested are preferably located at ¼ of the wavelength away from opposite short sides of the metal body and extend in the longitudinal direction of the metal body.

A method of testing the transmitting and/or receiving function of an antenna is also disclosed, comprising the steps of
 inserting the antenna into a hole in the appropriate side of a waveguide,
 inserting a test antenna from the same or the opposite side of the waveguide,
 transmitting a signal having a well-defined signal strength from the antenna or the test antenna,
 registering the signal strength received by the one of the antenna or the test antenna that did not transmit the signal.

The invention offers the following advantages:

It allows the testing of the antenna function while testing the RF transmission function.

The test equipment according to the invention may be made very small.

The shielding properties of the apparatus according to the invention are very good.

Since an air interface is used in the tests, the function of the whole transmission/receiving unit is tested, including the antenna itself.

The test equipment according to the invention is simple and inexpensive to produce compared to prior art.

DETAILED DESCRIPTION

A waveguide is a hollow metal body used as a transmission line, usually with a rectangular, square or circular cross-section. The electromagnetic wave in the wave guide can have an infinite variety of patterns, or modes, divided into two main groups: Transverse electric (TE) modes, in which the electric vector is always transverse to the direction of propagation, and Transverse magnetic (TM) modes in which the magnetic vector is always transverse to the direction of propagation.

The following discussion will be valid for rectangular waveguides. Two subscripts designate a particular mode. The first subscript designates the number of half-wave variations of the electric field across the wide dimension of the waveguide. The second subscript designates the number of half-wave variations of the electric field across the narrower dimension. Thus, in the $TE_{1,0}$ mode the electric field is always transverse to the propagation direction and the electric field has one half-wave variation across the wide dimension and none across the narrower dimension.

For each mode of operation in any waveguide, there is a cut-off wavelength $\lambda_c$. For the $TE_{1,0}$ mode in a rectangular waveguide, the cut-off wavelength $\lambda_c$ is twice the wide dimension. Signals having a wavelength below the cut-off wavelength propagate in the waveguide. Signals of longer wavelengths are attenuated. For any wavelength, a waveguide can be dimensioned so that only the $TE_{1,0}$ mode is below the cut-off wavelength and all other modes will be rapidly attenuated. Also, with the $TE_{1,0}$ mode the cross-section of the waveguide is minimized for a given wavelength.

The dimensions of a waveguide may be calculated by means of certain equations, The wider side, or a side should be in the interval $0.6\lambda_0$–$0.95\lambda_0$, $\lambda_0$ being the wavelength in free space. The narrower side should not be smaller than $0.45\lambda_0$. The wavelength in the waveguide, denoted $\lambda_g$, is defined as twice the distance between two minimum points in a standing wave pattern.

Figure 1:
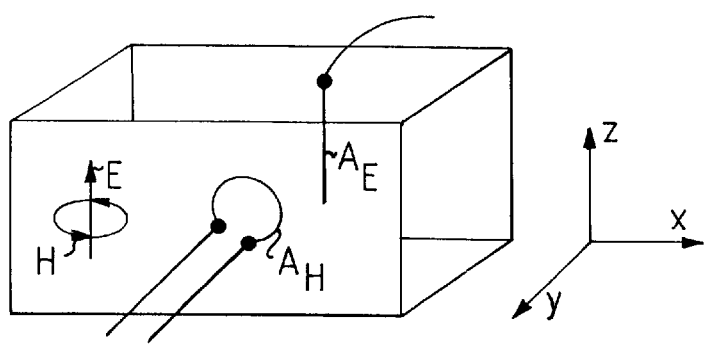
FIG. 1 shows a waveguide used according to the invention.

In the GSM band (890–960 MHz) this means that the waveguide can have inner dimensions of approximately 0.14 m×0.24 m×0.5 m FIG. 1 shows a waveguide used according to the invention. The waveguide has a rectangular cross-section. The shorter side of the rectangle extends along the z axis of a Cartesian co-ordinate system, the longer side of the rectangle extends along the y axis, and the waveguide extends longitudinally along the x axis.

The electric field in $TE_{1,0}$ mode, as shown by the vertical arrow E, extends between the two parallel walls having the smallest distance between them and the field strength varies along this distance, being highest in the middle of the waveguide and zero at the short walls. The magnetic field, as shown by the arrow H, extends parallel to the wide side of the waveguide.

Two fundamentally different types of antennas are shown in FIG. 1: one quarter-wave antenna $A_E$, which primarily registers the E field, and one loop antenna $A_H$, which primarily registers the H field. The quarter-wave antenna $A_E$ is inserted from the top of the waveguide, and the loop antenna AH is inserted from the side of the waveguide.

Figure 2:
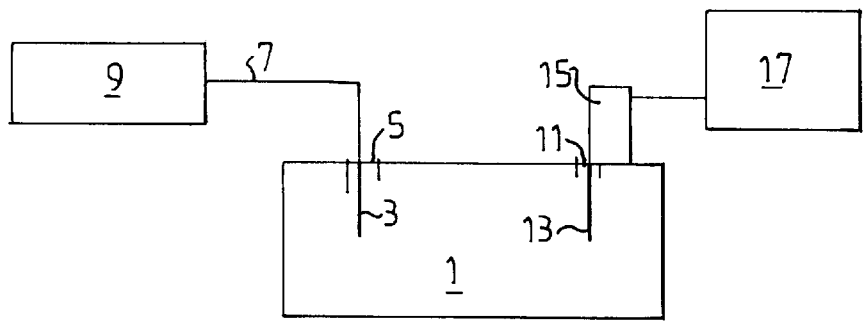
FIG. 2 shows the test equipment according to a first preferred embodiment of the invention.

FIG. 2 shows the measuring equipment according to a preferred embodiment of the invention. According to this embodiment, a metal box 1, with a rectangular cross-section and dimensioned to obtain a $TE_{1,0}$ mode, is used as a waveguide. Both ends of the waveguide 1 are closed, so that it is a closed box with a minimum of RF leakage.

A measuring probe 3 is inserted into a hole 5 in the waveguide 1 from the top, a distance of a quarter of a wavelength into the waveguide 1, forming a quarter-wave antenna 3. The quarter-wave antenna 3 is connected, for example, via a coaxial cable 7, to a measurement unit 9, such as a power meter or a base station simulating device. A distance of a quarter of a wavelength into the waveguide 1, on the same side as the measurement antenna there is a hole 11 adapted to receive an antenna 13 that is to be tested. The antennas may also be inserted from opposite sides.

Instead of a quarter wave antenna, another type of antenna may be used, such as a loop antenna.

In the embodiment shown, the antenna 13 being tested is connected to a device 15, which may be a mobile telephone. To test the transmission of the mobile telephone, the mobile telephone 15 generates a signal, which is registered by the antenna 3 and forwarded through a coaxial cable to the measuring device 9. When testing the receiving function of the mobile telephone 15, instead a signal is transmitted by the antenna 3. The mobile telephone 15 measures the received signal strength and transmits digital data, for example, to a computer to display the results.

In the embodiment shown in FIG. 2, the ends of the waveguide are closed, and the waves reflected at these ends are utilized by making sure they have the same phase as the direct signal so that they will be added to this signal. The phase is frequency dependent, and in order to maximize the bandwidth of the waveguide, it is advantageous to eliminate the reflected signal instead.

Figure 3:
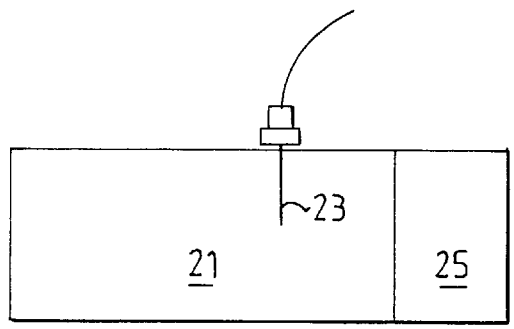
FIG. 3 shows the test equipment according to a second preferred embodiment of the invention.

This may be achieved as shown in FIG. 3, by covering the ends of the waveguide with a material that will attenuate the signal. Only one end of the waveguide 21 is shown, comprising a quarter-wave antenna 23 for registering the signal. The antenna 23 is connected to a measuring equipment (not shown). The end of the waveguide is covered by a material 25 that will absorb the power so that the reflections are effectively eliminated.

Figure 4:
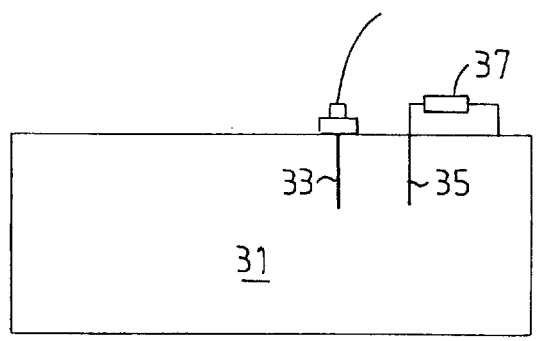
FIG. 4 shows the test equipment according to a third preferred embodiment of the invention.

FIG. 4 shows another way of minimizing the reflected signal. As in FIG. 3, only the end of a waveguide 31 is shown, comprising an antenna 35 for registering the signal. The waveguide also comprises a so called pick-up antenna 37 for picking up the reflected signal. The pick-up antenna 37 is positioned at a distance of half a wavelength from the short end and is connected to a load resistance 39 in which the power received by the antenna 37 will be absorbed.

Figure 5:
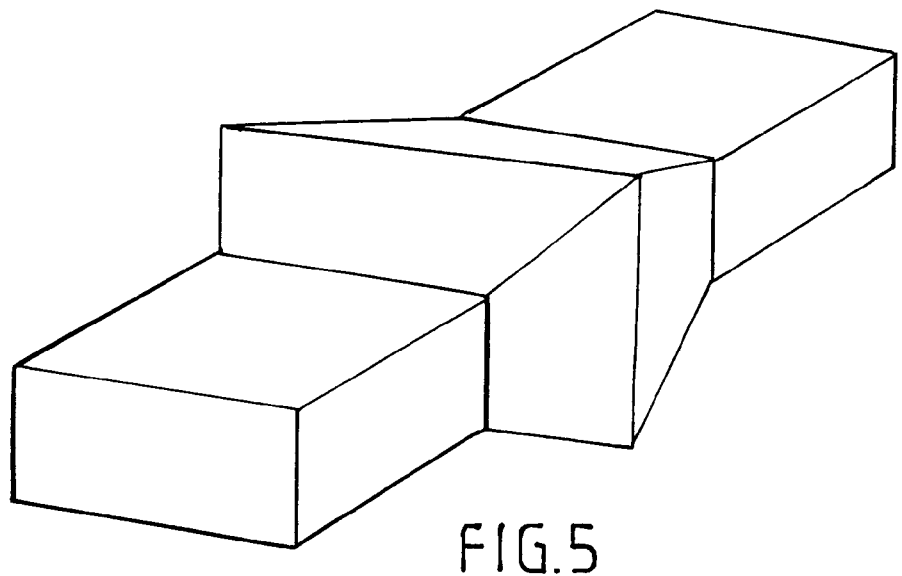
FIG. 5 shows the test equipment according to a fourth preferred embodiment of the invention, in which dual band apparatuses may be tested.

FIG. 5 shows an embodiment of the invention which is useful if the device to be tested should be placed inside the waveguide and is too big for the waveguide used. The cross-section of the waveguide is increased in the middle of its longitudinal dimension, in both other dimensions, to form a horn section which will function as an antenna for use in the microwave range. The device to be tested (not shown) is placed in the horn section in the middle, and measurement antennas (not shown) can be placed in one or both end sections. The end sections may be of different lengths, for example, in dependence of the wavelengths to be measured in them.

The design of the horn section is well known in the art. The angle of the horn section relative to the longitudinal axis of the waveguide should not be too wide. In practice, this angle should not exceed 30 degrees, so that the total angle of the horn section does not exceed 60 degrees. All four sides may be expanded in the horn section, or only two opposite sides, depending on the dimensions of the device to be placed in the horn section.

Figure 6:
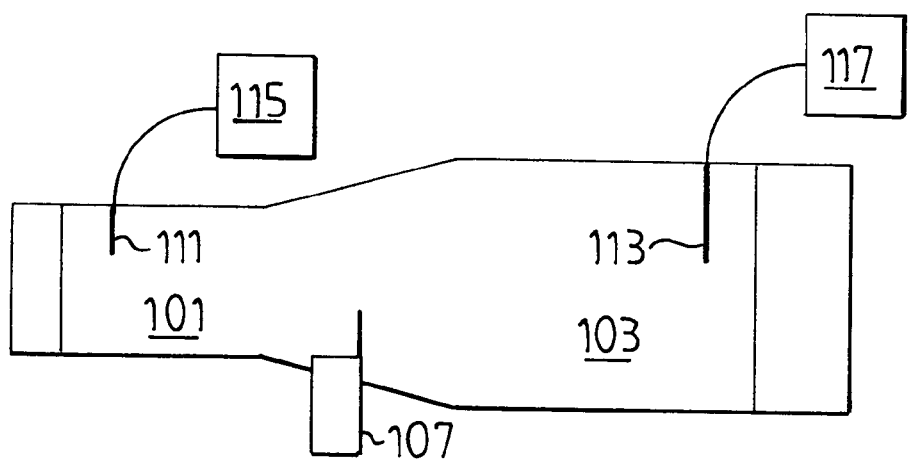
FIG. 6 shows the test equipment according to a fifth preferred embodiment of the invention.

FIG. 6 shows an embodiment of the invention suitable for testing dual band telephones. Such telephones are becoming increasingly common, for example for GSM and DECT standards, using the frequencies 900 MHz and 1800 MHz, respectively. These two frequency bands cannot normally be tested in the same waveguide. In FIG. 6, effectively, two waveguides 101, 103 are joined together in a horn formed section 105. The dimensions of the first waveguide 101 are adapted to the DECT standard and the dimensions of the second waveguide 103 are adapted to the GSM standard. Thus, the dimensions of the second waveguide 103 are the same as discussed above for GSM. The device 107 to be tested is placed in the horn section 105 between the waveguides 101, 103. An antenna 111, 113 is placed in each of the waveguides, for registering the signals transmitted by the device 107 in the frequency band concerned. The antenna 111, 113 is placed at a distance of substantially a quarter of a wavelength of the signal to be measured, from the end of the waveguide. As mentioned above, if the short ends are covered with an attenuating material, the distance may be allowed to deviate more than if the short ends re reflecting. The antennas 111, 113 are connected to measuring equipment 115, 117. As before, of course, the function of the antennas may be changed to test the receiving properties of the device 107. In this case each of the antennas 111, 113 transmits a signal in the appropriate frequency band and the signal received in the device 107 is measured. In this case a measuring device (not shown) must be connected to the device 107.

Figure 7:
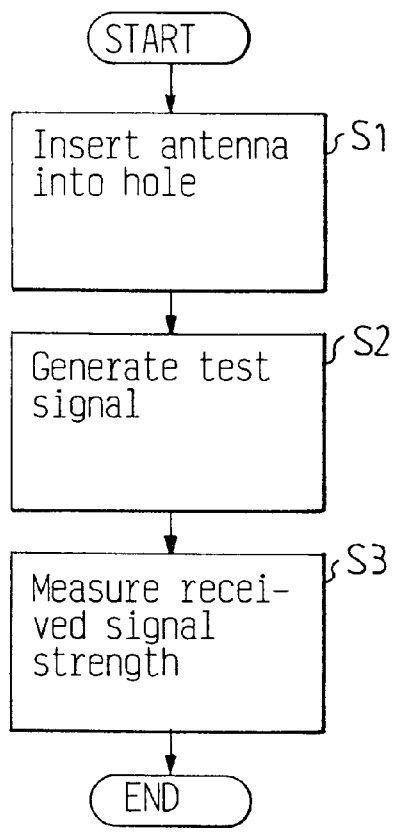
FIG. 7 is a flow chart of the actions taken to test an antenna according to the invention.

FIG. 7 is a flow chart of the actions taken to test an antenna according to the invention:

Step S1: Insert the antenna to be tested into the appropriate hole in the waveguide.

Step S2: Generate a test signal using the signal generator connected to the test transmission antenna.

Step S3: Measure the power received in the antenna being tested. Repeat steps S1–S3 for different signal frequencies until the desired frequency range has been covered.

Calibration

Before these measurements can be carried out, the test equipment has to be calibrated, to account for the attenuation in the waveguide. The calibration should be carried out using a calibration device, with a known sensitivity, of the same kind that is to be tested. The device is placed in the waveguide in the same way as the device to be tested, and signals of a known signal strength are transmitted by the measuring probe 3. The signal strength is measured in the calibration device and the result is output to a device, usually a computer. Alternatively, the calibration device transmits a signal having a known signal strength, and the signal strength received by the measuring probe 3 is measured. in both cases, the computer calculates a calibration constant based on the relationship between the output signal strength and the received signal strength.

The calibration constants resulting from the measurements are used for corrections in the subsequent tests. The precision on the positioning of the tested device and the receiving antenna will affect the measurement inaccuracy.

Figure 8:
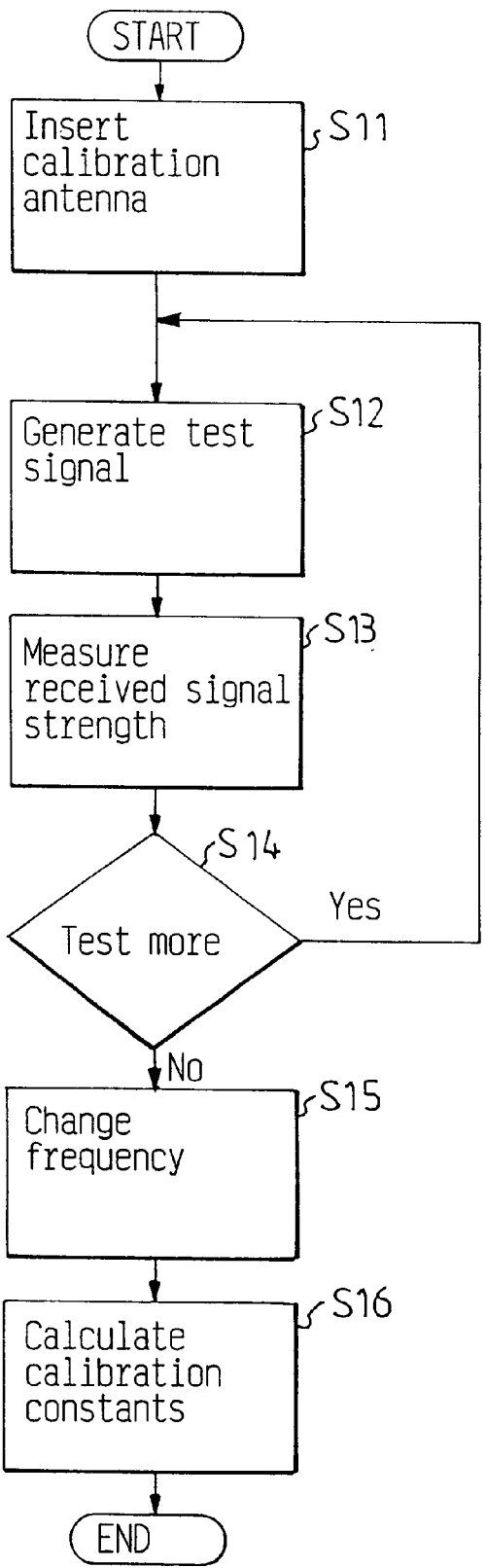
FIG. 8 is a flow chart of the actions taken to calibrate the measuring device according to the invention.

FIG. 8 is a flow chart of the actions taken to calibrate the measuring device according to the invention:

Step S11: Insert the calibration antenna into the hole intended for an antenna to be tested.

Step S12: Transmit a test signal. The test signal may be generated using the signal generator connected to the measuring probe and transmitted by the measuring probe, or it may be generated and transmitted by the calibration device. In the former case, it is received by the calibration device; in the latter case, it is received by the measuring probe.

Step S13: Measure the received signal strength.

Step S14: Should more frequencies be measured? If yes, go to step S15; if no, go to step S16.

Step S15: Change the transmission frequency of the test signal. Go to step S12.

Step S16: Calculate the calibration constants on the basis of the transmitted and the received signal strengths.

The antenna 13 to be tested is inserted into the hole 11. If the antenna 13 is short, it may be desirable to insert part of the device 15 to which the antenna belongs into the waveguide 1. This, however, would require a bigger hole 11, which would lead to a power loss. If the device tested is made of metal and covers the hole, the loss will usually be negligible. It is also possible to enclose the whole waveguide in a metal box that will keep the leakage energy. Also, the orientation of the holes is important. A square hole, or an elongated hole across the waveguide will cause high losses. An elongated hole along the longitudinal side of the waveguide will cause practically no loss at all.

The discussion above has concentrated on TE10 mode waveguides with rectangular cross-sections. Of course, other types of waveguides may also be used. the use of a ridge waveguide, for example, will increase the relative bandwidth of the waveguide, enabling a larger range of frequencies to be tested by means of the same waveguide. If required, for example to reduce its size, the waveguide may be bent to an L shape or a U shape. It will, however, still function as a conventional waveguide as discussed above.

The distance between the antennas must not be too short, since the field in the close vicinity of the transmitting antenna is not reliable. After calibration, the distance should be kept substantially constant, that is, the variation should be kept within a few millimetres. The distance is particularly critical if the short ends of the waveguide reflect the signal. If the signal is absorbed at the ends, the distance becomes less critical.

A suitable metal for the waveguide is brass, which is relatively inexpensive and easily machined and soldered. As is well known in the art, other metals such as aluminium, magnesium or silver may be used instead.

In the examples above, the antennas are all inserted from the same side. The insertion side is dependent on the type of antenna, in terms of the field generated. The directions of the E and H fields generated in the tested device must coincide with the directions that can be propagated inside the waveguide.

What is claimed is:

1. An apparatus for testing a receiver of electromagnetic waves, said apparatus comprising:

a hollow metal body dimensioned to function as a waveguide for said electromagnetic waves, said metal body being enclosed on all sides and having a first hole for receiving a test antenna and a second hole for receiving a portion of a device to be tested, a test antenna inserted into said first hole, and a signal generating device connected to said test antenna.

2. An apparatus for testing a transmitter of electromagnetic waves, said apparatus comprising:

a hollow metal body dimensioned to function as a waveguide for said electromagnetic waves, said metal body being enclosed on all sides and having a first hole for receiving a test antenna and a second hole for receiving a portion of a device to be tested, a test antenna inserted into said first hole, and a signal measuring device connected to said test antenna.

3. An apparatus according to claim 1, wherein the cross-section of the hollow metal body is rectangular.

4. An apparatus according to claim 3, wherein the holes for inserting the test antenna and the device to be tested are located on the same side of the waveguide, and this side is one of the two largest sides of the metal body.

5. An apparatus according to claim 4, wherein the sides of the metal body not comprising said holes are completely solid.

6. An apparatus according to claim 1, wherein the holes for inserting the test antenna and the antenna to be tested are located at ¼ of the wavelength away from opposite short sides of the metal body.

7. An apparatus according to claim 1, wherein the holes for inserting the test antenna and the antenna to be tested are elongated in the longitudinal direction of the metal body.

8. An apparatus according to claim 1, wherein the test antenna and the signal generator or measuring device are connected through a coaxial cable.

9. An apparatus for testing a device for receiving and transmitting electromagnetic waves comprising:

a first hollow metal body dimensioned to function as a waveguide for electromagnetic waves in a first frequency range, said first hollow metal body having a first hole for receiving a first test antenna, a second hollow metal body dimensioned to function as a waveguide for electromagnetic waves in a second frequency range, said second hollow metal body having a second hole for receiving a second test antenna, a section connecting said first and second hollow metal bodies, said section having a third hole for receiving the device to be tested, wherein the first hollow metal body, the second hollow metal body, and the section connecting the first and second hollow metal bodies form a substantially enclosed structure, and at least one of a signal generating device and a signal measuring device, each connected to said test antenna.

10. A method of testing a transmitting function of an antenna comprising the steps of:

inserting an antenna into a first hole in a side of a waveguide, said waveguide being a substantially enclosed structure, inserting a test antenna into one of the same and an opposite side of the waveguide, transmitting a signal having a corresponding signal strength from the antenna, and registering the signal strength received by the test antenna.

11. A method of testing a receiving function of an antenna comprising the steps of:

inserting an antenna into a first hole in a side of a waveguide, said waveguide being a substantially enclosed structure, inserting a test antenna into a second hole in one of the same and an opposite side of the waveguide, transmitting a signal having a corresponding signal strength from the test antenna, and registering the signal strength received by the antenna.

12. A method according to claim 10, further comprising the step of processing the registered signal strength depending on previously recorded calibration data.

* * * * *